US012385313B2

(12) United States Patent
Kim et al.

(10) Patent No.: US 12,385,313 B2
(45) Date of Patent: Aug. 12, 2025

(54) POP-UP ACTUATOR FOR VEHICLE DOOR

(71) Applicants: Hyundai Motor Company, Seoul (KR); Kia Corporation, Seoul (KR); PYEONG HWA AUTOMOTIVE CO., LTD., Daegu (KR)

(72) Inventors: Yong-Jae Kim, Anyang-Si (KR); Jung-Ho Han, Seoul (KR); Jeong-Han Yoon, Daegu (KR); Kyung-Yul Kim, Daegu (KR)

(73) Assignees: Hyundai Motor Company, Seoul (KR); Kia Corporation, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 0 days.

(21) Appl. No.: 18/370,822

(22) Filed: Sep. 20, 2023

(65) Prior Publication Data

US 2024/0301740 A1 Sep. 12, 2024

(30) Foreign Application Priority Data

Mar. 6, 2023 (KR) ........................ 10-2023-0029143

(51) Int. Cl.
*E05F 15/622* (2015.01)

(52) U.S. Cl.
CPC .................................. *E05F 15/622* (2015.01)

(58) Field of Classification Search
CPC ........... E05Y 2201/696; E05Y 2900/50; E05Y 2201/422-426; E05Y 2400/32; E05Y 2400/328
See application file for complete search history.

(56) References Cited

U.S. PATENT DOCUMENTS

| | | | | |
|---|---|---|---|---|
| 6,711,856 | B1 * | 3/2004 | Hoffman | E05F 1/105 49/386 |
| 9,104,245 | B2 * | 8/2015 | Furukawa | H03K 17/975 |
| 9,995,066 | B1 * | 6/2018 | Ottolini | E05F 15/616 |
| 10,087,671 | B2 * | 10/2018 | Linden | E05B 81/56 |
| 10,240,663 | B2 * | 3/2019 | Nickel | B60N 2/919 |
| 10,435,924 | B1 * | 10/2019 | Salter | E05B 81/78 |
| 10,763,053 | B2 * | 9/2020 | Kosugi | H01H 13/52 |
| 11,085,223 | B2 * | 8/2021 | Oestermann | E05F 15/79 |
| 11,168,497 | B2 * | 11/2021 | Distefano | E05B 81/06 |

(Continued)

FOREIGN PATENT DOCUMENTS

| | | | |
|---|---|---|---|
| DE | 102019128526 B3 * | 3/2021 | A47L 15/4259 |
| KR | 10-2020-0101072 A | 8/2020 | |

(Continued)

*Primary Examiner* — Daniel P Cahn
*Assistant Examiner* — Patrick B. Ponciano
(74) *Attorney, Agent, or Firm* — MORGAN, LEWIS & BOCKIUS LLP

(57) ABSTRACT

A pop-up actuator for a vehicle door is applied to a vehicle door and pops up a circumferential portion of the door from a vehicle body when a signal for opening the door is inputted, allowing an occupant to easily open the door. The pop-up actuator for a vehicle door includes a housing provided in a vehicle, a drive motor mounted in the housing, a nut rod configured to rectilinearly moved by operation of the drive motor, and an operating rod coupled to an external portion of the nut rod and configured to extend from the housing by a forward movement of the nut rod to move the door away from a vehicle body.

16 Claims, 13 Drawing Sheets

(56) References Cited

U.S. PATENT DOCUMENTS

| | | | | |
|---|---|---|---|---|
| 11,180,943 | B2 * | 11/2021 | Khan | E05F 15/42 |
| 11,447,987 | B2 * | 9/2022 | Ottolini | E05B 81/20 |
| 11,466,501 | B2 * | 10/2022 | Dora | E05F 1/1261 |
| 11,739,570 | B2 * | 8/2023 | Debroucke | E05B 81/05 292/201 |
| 11,814,891 | B2 * | 11/2023 | Cumbo | E05B 81/06 |
| 2018/0038146 | A1 * | 2/2018 | Linden | E05B 81/64 |
| 2019/0203508 | A1 * | 7/2019 | Harajli | E05F 15/60 |
| 2019/0292818 | A1 * | 9/2019 | Cumbo | E05B 81/77 |
| 2020/0262386 | A1 * | 8/2020 | Sasaki | E05B 77/02 |
| 2020/0263458 | A1 | 8/2020 | Nam | |

FOREIGN PATENT DOCUMENTS

| | | | | |
|---|---|---|---|---|
| WO | WO-2007137670 | A1 * | 12/2007 | E05F 1/105 |
| WO | WO-2025040201 | A1 * | 2/2025 | F16H 25/2003 |

* cited by examiner

POP-UP ACTUATOR FOR VEHICLE DOOR

CROSS-REFERENCE TO RELATED APPLICATION

The present application claims priority to Korean Patent Application No. 10-2023-0029143, filed on Mar. 6, 2023, the entire contents of which is incorporated herein for all purposes by this reference.

BACKGROUND OF THE PRESENT DISCLOSURE

Field of the Present Disclosure

The present disclosure relates to a pop-up actuator for a vehicle door, which is applied to a vehicle door and pops up a circumferential part of the door from a vehicle body when a signal for opening the door is inputted, allowing an occupant to easily open the door.

Description of Related Art

A door is provided at one side of a vehicle to allow an occupant to get in or out of the vehicle.

Generally, the occupant releases a latch of the door by operating a door handle provided on the door, and the occupant opens the door by rotating the door.

Recently, as convenience is improved, the occupant manipulates a switch provided at one side of the door or a vehicle body instead of operating the door handle. When the occupant touches the switch, a pop-up actuator operates and pops up a circumferential part of the door from the vehicle body, and the occupant is able to hold and open the popped-up door.

However, there is a problem in that an inertia sensor for detecting an opened or closed state of the door needs to be applied to the door that adopts the pop-up actuator. Because the inertia sensor is an expensive component, there is a problem in that costs of the vehicle increase in case that the pop-up actuator is applied to improve convenience.

Furthermore, because the inertia sensor indirectly detects an operation of the pop-up actuator, there is a problem in that the pop-up actuator erroneously operates due to a detecting error.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pop-up actuator for a vehicle door, which may easily detect an opened state of a door with a simple structure while providing convenience at the time of opening the door.

As an exemplary embodiment of the present disclosure, a pop-up actuator for a vehicle door includes: a housing provided in a vehicle: a drive motor mounted in the housing: a nut rod coupled to the drive motor and configured to be linearly moved by operation of the drive motor; and an operating rod coupled to an external portion of the nut rod and configured to extend from the housing by a forward movement of the nut rod to move the door away from a vehicle body.

The pop-up actuator may further include: an elastic member provided at a front end portion of the nut rod, inserted into the operating rod, and configured to pop up the operating rod by an elastic force of the elastic member, in which the elastic member is compressed by the nut rod when the nut rod is moved forward by a forward rotation of the drive motor, and the operating rod is extended from the housing as the operating rod moves forward relative to the nut rod when the nut rod moves forward with a predetermined distance or more than the predetermined distance so that the operating rod pops up the door.

The pop-up actuator may further include: a controller electrically connected to the drive motor and mounted on the door and configured to rotate the drive motor in a forward direction so that the operating rod is extended from the housing when an outside switch is operated by an occupant.

A terminal may be provided to detect a position of the nut rod.

The terminal may include: a first terminal configured to detect an initial position of the nut rod; and a second terminal configured to detect a forward movement of the nut rod when the nut rod moves forward with a predetermined distance.

The nut rod may include a contactor configured to be selectively connected to one of the first terminal and the second terminal.

An operation switch may be provided to output a signal to the controller so that the operating rod and the nut rod return to initial positions when the operating rod is maximally extended.

The operation switch may be provided to operate after the contactor is connected to the second terminal.

A protruding portion may be formed to protrude from the operating rod in a radial direction of the operating rod, and the protruding portion may come into contact with the operation switch when the operating rod is maximally extended.

The pop-up actuator may further include: a lead nut fastened to a rear end portion of the nut rod, in which the contactor is mounted on the lead nut.

When the outside switch operates, the nut rod may be moved forward by a forward rotation of the drive motor, and the contactor may be separated from the first terminal.

The controller may stop the forward rotation of the drive motor when the nut rod moves forward with a predetermined distance, and the contactor is connected to the second terminal.

When the operating rod is maximally extended and the operation switch operates, the nut rod may move rearward thereof, and the drive motor may rotate in a reverse direction so that the operating rod and the nut rod return to the initial positions thereof.

The controller may be configured to stop the reverse rotation of the drive motor when the nut rod moves rearward thereof, and the contactor is connected to the first terminal.

A damper may be provided at a front end portion of the operating rod.

A coupling groove may be provided in a form of an elongated hole and formed in an external portion of the operating rod, and a coupling protrusion may be formed on an external portion of the nut rod and engage with the coupling groove.

The pop-up actuator may further include: a lead screw threaded-coupled to the nut rod and configured to be rotated by the drive motor and linearly move the nut rod.

A worm gear may be mounted on an output shaft of the drive motor, and a worm wheel may be mounted on the lead screw and be in mesh with the worm gear.

The housing may be provided on the door, and the operating rod may pop up the door while being extended from the door toward the vehicle body.

According to the pop-up actuator for a vehicle door of the present disclosure configured as described above, an expensive inertia sensor is not used to detect a state of the pop-up actuator, and the pop-up actuator is directly connected to the operation switch or terminal, which may improve durability and reduce costs.

Furthermore, whether the door is opened by operation of the pop-up actuator is directly detected by switching instead of detecting using an inertia sensor, which may reduce malfunction.

Furthermore, even in a state in which moisture is frozen between the door and the vehicle body in the winter season, the pop-up actuator may pop up the door, which improves convenience for the occupant and prevents the door from being defectively opened or closed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
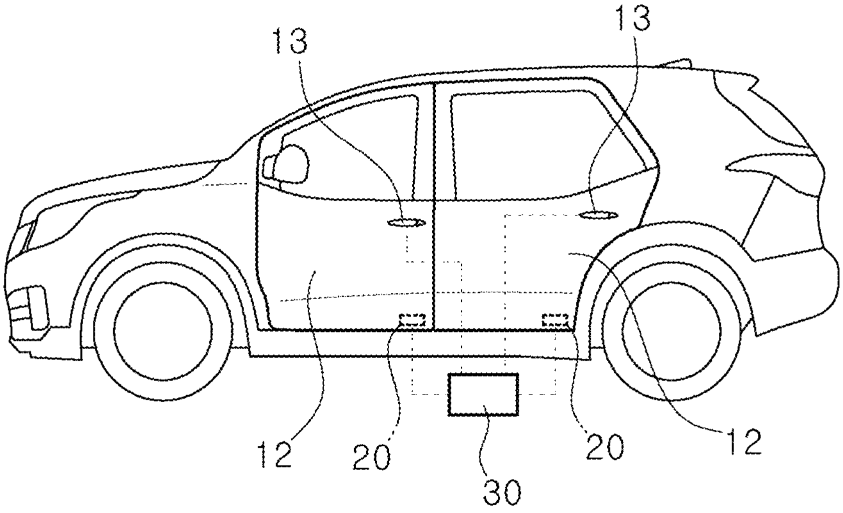
FIG. 1 is a side view of a vehicle to which a pop-up actuator for a vehicle door according to an exemplary embodiment of the present disclosure is applied.
Figure 2:
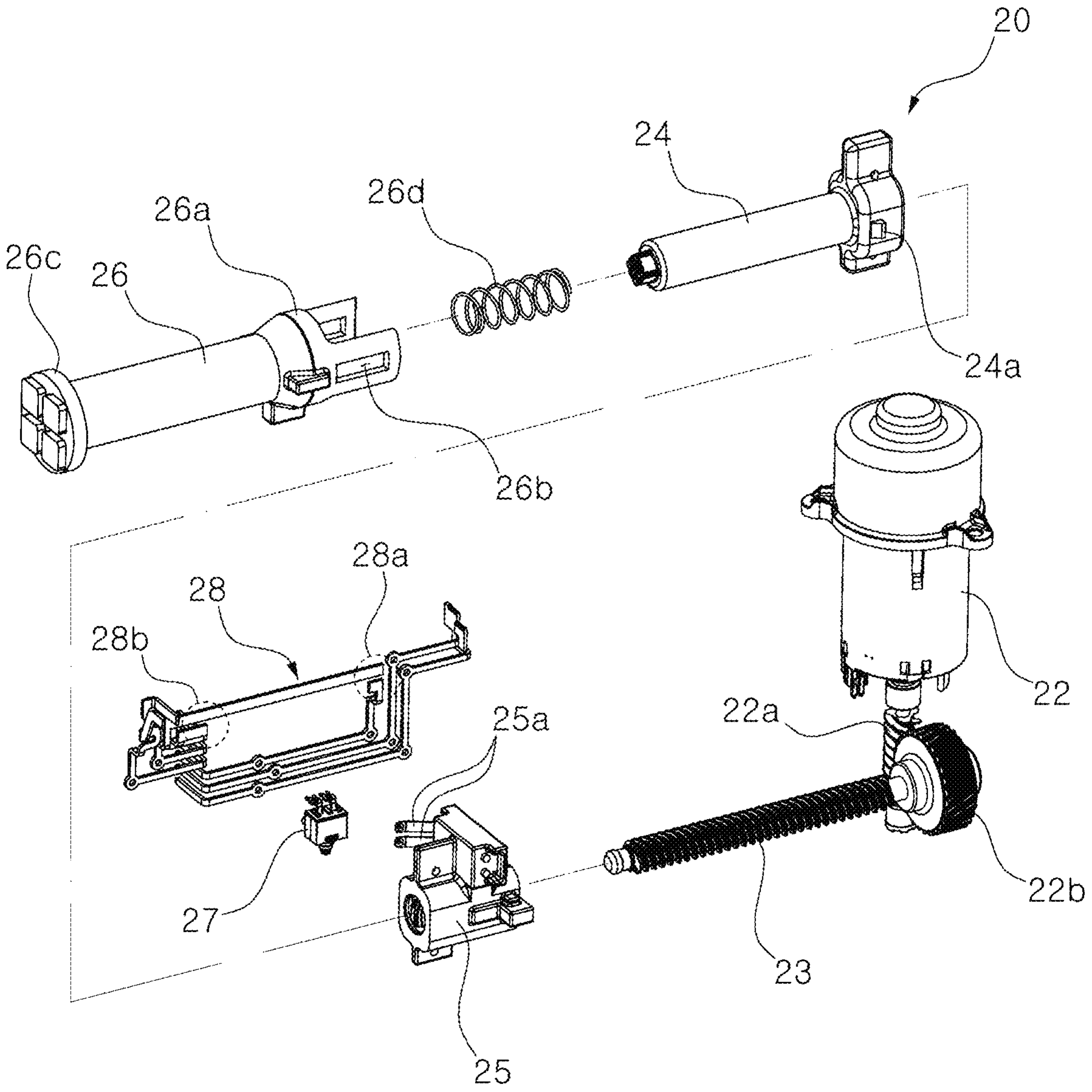
FIG. 2 is an exploded perspective view exemplarily illustrating the pop-up actuator for a vehicle door according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the exemplary accompanying drawings, and because these embodiments, as examples, may be implemented in various different forms by those skilled in the art to which the present disclosure pertains, they are not limited to the exemplary embodiments described herein.

Hereinafter, a pop-up actuator for a vehicle door according to an exemplary embodiment of the present disclosure will be described in detail with reference to the accompanying drawings.

The pop-up actuator for a vehicle door according to an exemplary embodiment of the present disclosure may include: a housing 21 provided in a vehicle: a drive motor 22 provided in the housing 21; a nut rod 24 configured to linearly move by operation of the drive motor 22; and an operating rod 26 coupled to an external portion of the nut rod 24 and configured to extend from the housing 21 by a forward movement of the nut rod 24 to move the door 12 away from a vehicle body 11.

The housing 21 may have therein a space in which constituent elements to be described below are accommodated. The housing 21 may be mounted at one side of the door 12 so that the pop-up actuator 20 is provided on the door 12. The housing 21 may be closed by a cover after the constituent elements are mounted in the housing 21. The cover and the housing 21 may be airtight by sealing. The housing 21 may be provided on the door 12 so that the pop-up actuator 20 is deployed from the door 12 toward the vehicle body 11. Meanwhile, as a modification, the housing 21 may be provided on the vehicle body 11 so that the pop-up actuator 20 may be deployed from the vehicle body 11 toward the door 12.

An opening portion may be formed at one side of the housing 21 which the operating rod 26 is extended from or moved back into. A housing cap 21*a* may be provided in the opening portion to close the opening portion. The housing cap 21*a* may include a through-hole so that the operating rod 26 is extended from or retracted into the through-hole.

The drive motor 22 may be provided in the housing 21. The drive motor 22 rotates forward or reversely in response to an operating state of the pop-up actuator 20. In the instant case, the forward rotation refers to a rotation of the drive motor 22 in one direction, which extends the operating rod 26 so that the pop-up actuator 20 is deployed. The reverse rotation refers to a rotation in a direction opposite to the direction of the forward rotation.

A lead screw 23 may be rotated by the drive motor 22.

A power transmission member may be provided between the drive motor 22 and the lead screw 23 and transmits power from the drive motor 22 to the lead screw 23. For example, a worm gear 22*a* may be provided on an output shaft of the drive motor 22, and a worm wheel 22*b*, which engages with the worm gear 22*a*, may be provided on the lead screw 23 so that the lead screw 23 rotates together with the drive motor 22 as the drive motor 22 rotates.

The nut rod 24 may be thread-coupled to the lead screw 23 in the housing 21. The nut rod 24 may be provided in the housing 21 to be movable in an axial direction of the nut rod 24 without rotating. Because the nut rod 24 is thread-coupled to the lead screw 23, the nut rod 24 may linearly move when the lead screw 23 rotates. Therefore, the nut rod 24 may move forward or rearward depending on a rotation direction of the lead screw 23.

A lead nut 25 may be coupled to a rear end portion of the nut rod 24 and may close the rear end portion of the nut rod 24. The lead nut 25 may move forward or rearward together with the nut rod 24. A contactor 25*a* may be provided on an external portion of the lead nut 25. When the lead nut 25 moves forward or rearward together with the nut rod 24, the contactor 25*a* may be connected to a first terminal 28*a* or a second terminal 28*b*. When the contactor 25*a* made of a metallic material is connected to the first terminal 28*a* or the second terminal 28*b*, a position of the lead nut 25 and a position of the nut rod 24 may be detected.

The operating rod 26 may be coupled to an external portion of the nut rod 24. The operating rod 26 may be formed in a hollow shape, and the nut rod 24 may be slidably provided in the operating rod 26. The operating rod 26 may be formed so that one end portion thereof is closed, and the other end portion thereof is open. The nut rod 24 may be inserted through the other end portion of the operating rod 26.

The operating rod 26 and the nut rod 24 may be coupled by a coupling groove 26*b* and a coupling protrusion 24*a*. The coupling groove 26*b* may be formed at the other end portion of the operating rod 26, and the coupling protrusion 24*a* may be formed on the nut rod 24. When the nut rod 24 is inserted into the operating rod 26, the coupling protrusion 24*a* may be caught by the coupling groove 26*b* so that the operating rod 26 and the nut rod 24 are coupled. In the instant case, the coupling groove 26*b* may be provided in a form of an elongated hole and formed in a longitudinal direction of the operating rod 26 so that the nut rod 24 may slide by a predetermined length in the operating rod 26.

A protruding portion 26*a* may be formed at the other end portion of the operating rod 26 and may protrude in a radial direction of the operating rod 26. When the operating rod 26 is maximally extended from the housing 21, the protruding portion 26*a* may come into contact with an operation switch 27 so that the operation switch 27 operates.

An elastic member 26*d* may be inserted into the operating rod 26 and compressed or extended in the longitudinal direction of the operating rod 26. The elastic member 26*d* may be provided in the operating rod 26 to contact with a front end portion of the nut rod 24. For example, the elastic member 26*d* may be provided in a form of a spring including a coil shape. At the initial time of the operation of the drive motor 22, the elastic member 26*d* may be compressed by the forward movement of the nut rod 24. After the elastic member 26*d* is maximally compressed, the elastic member 26*d* applies a force that pushes the operating rod 26 toward the vehicle body 11. Therefore, the operating rod 26 may be extended toward the vehicle body 11 to pop up the door 12 from the vehicle body 11.

A damper 26*c* may be provided at a front end portion of the operating rod 26 and may prevent impact and noise that occur when the operating rod 26 collides with the vehicle body 11. The damper 26*c* may be made of a material such as rubber and may reduce impact or noise that occurs when one end portion of the operating rod 26 strikes the vehicle body 11 when the operating rod 26 is extended.

The operation switch 27 may be mounted in the housing 21. When the operating rod 26 moves, the operation switch 27 may be operated by the protruding portion 26*a* formed on the external portion of the operating rod 26. That is, when the operating rod 26 is maximally extended from the housing 21, the protruding portion 26*a* may operate the operation switch 27, and the pop-up actuator 20 may begin to be retracted.

A pattern unit 28 may include a plurality of patterns to apply power to the drive motor 22, detect a position of the nut rod 24, or input an operational signal for the operation switch 27. The pattern unit 28 may be inserted and embedded in the housing 21, and one side of the pattern unit 28 may be connected to a separate connector.

The pattern unit 28 may include the first terminal 28*a* and the second terminal 28*b*. The first terminal 28*a* and the second terminal 28*b* may be electrically connected to the contactor 25*a* provided on the lead nut 25. The first terminal 28*a* may have two patterns separated apart from each other. When the contactor 25*a*, which is a conductor, connects the two patterns, a circuit may be configured, and the position of the lead nut 25 may be detected. Likewise, the second terminal 28*b* may have two patterns kept separated from each other. When the contactor 25*a* connects the two patterns, the position of the lead nut 25 may be detected. When the nut rod 24 and the lead nut 25 are positioned at initial positions, the first terminal 28*a* may be connected to the contactor 25*a*. When the nut rod 24 and the lead nut 25 move forward with a predetermined distance, the second terminal 28*b* may be connected to the contactor 25*a* to detect the forward movements of the nut rod 24 and the lead nut 25.

Meanwhile, as a modification, the first terminal 28*a* and the second terminal 28*b* may be substituted with switches. That is, the first terminal 28*a* and the second terminal 28*b* may be provided as switches that are operated by the contactor 25*a* when the lead nut 25 is positioned at the initial position and the lead nut 25 is maximally extended, respectively.

When a signal is inputted from an outside switch 13 provided on the door 12, a controller 30 may be configured to control rotation of the drive motor 22. Furthermore, when signals are inputted from the operation switch 27, the first terminal 28*a*, and the second terminal 28*b*, the controller 30 electrically connected to the drive motor 22 may be configured for controlling the drive motor 22 to control the operation of the pop-up actuator 20 so that the pop-up actuator 20 is fully deployed or returns to an initial state.

An operation of the pop-up actuator for a vehicle door according to an exemplary embodiment of the present disclosure, which is configured as described above, will be described below.

Figure 3A:
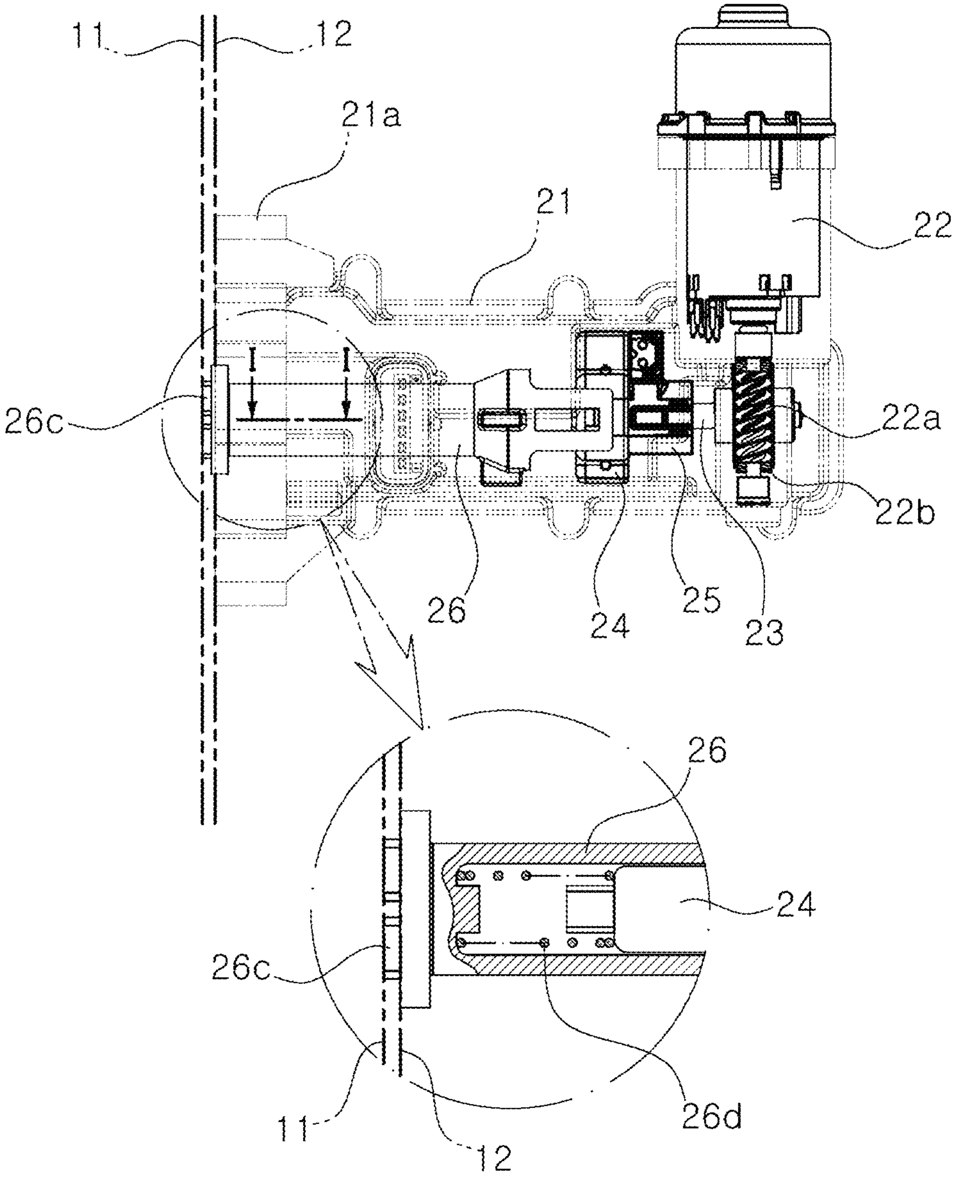
FIG. 3A is a perspective view including an enlarged and encircled view indicated by a dotted arrow in a cross-sectional view according to line I-I and shown in the lower part.
Figure 3B:
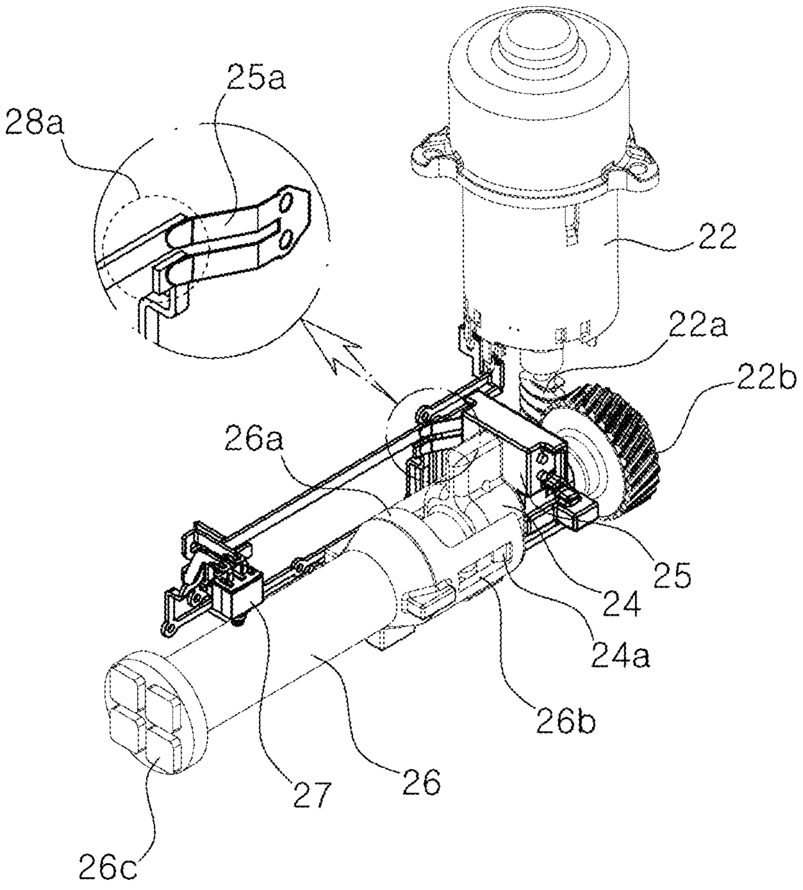
FIG. 3B is an isometric view in the upper part of FIG. 3A, illustrating a state before the pop-up actuator for a vehicle door according to an exemplary embodiment of the present disclosure operates.

In a state in which the door 12 is closed (see FIG. 3A and FIG. 3B), the pop-up actuator 20 may not be extended from the housing 21. Furthermore, a circumferential portion of the door 12 may be in contact with the vehicle body 11 of the vehicle. When the door 12 is closed, the contactor 25*a* may be connected to the first terminal 28*a*, and the controller 30 may recognize that the operating rod 26, the nut rod 24, the lead nut 25, and the like are accommodated in the pop-up actuator 20.

Figure 4A:
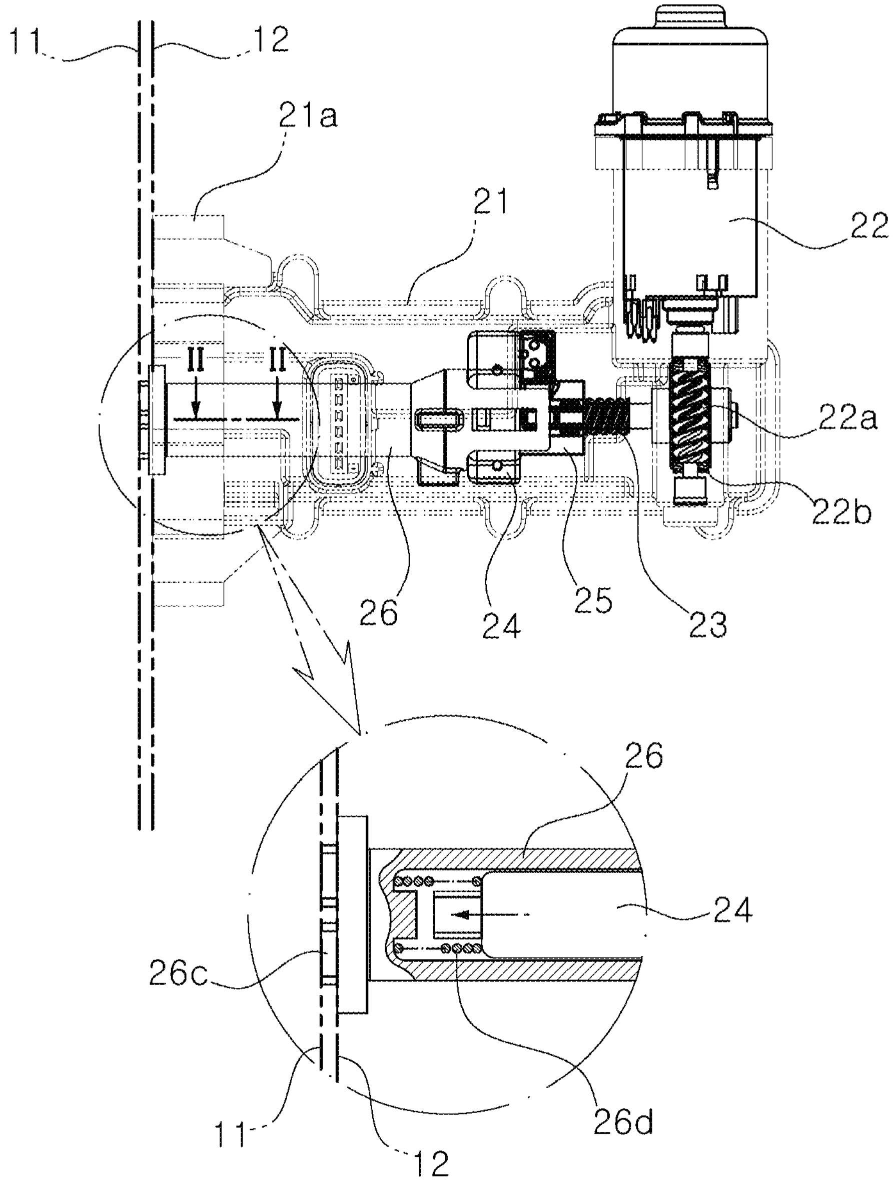
FIG. 4A is a perspective view including an enlarged and encircled view indicated by a dotted arrow in a cross-sectional view according to line II-II and shown in the lower part.
Figure 4B:
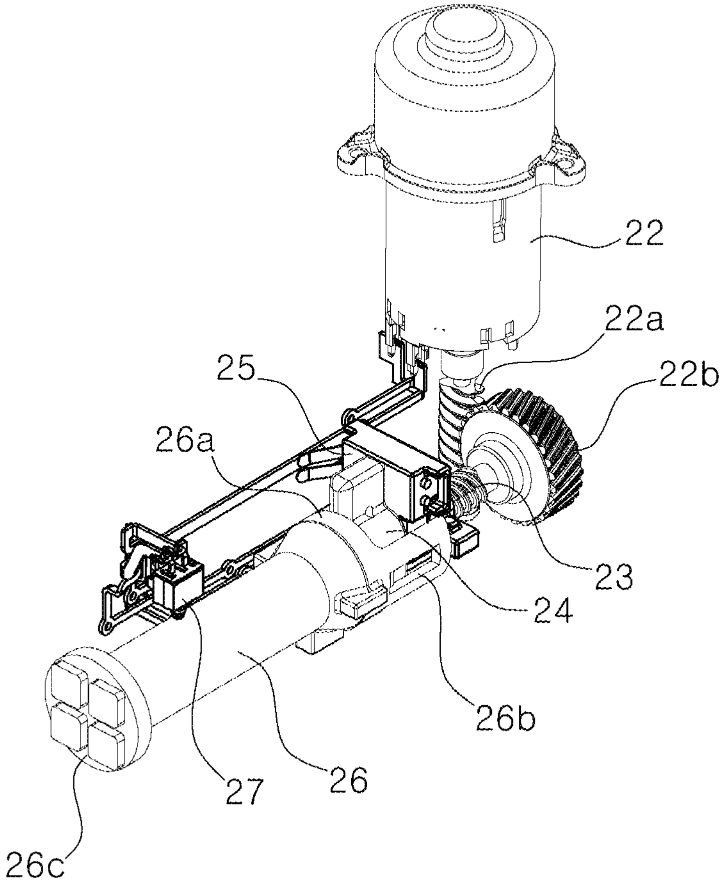
FIG. 4B is an isometric view in the upper part of FIG. 4A, illustrating an initial operation state of the pop-up actuator for a vehicle door according to an exemplary embodiment of the present disclosure.

When the occupant operates the outside switch 13 provided on an outside handle to get in the vehicle, the drive motor 22 may begin to operate by the controller 30, and the nut rod 24 may move forward and compress the elastic member 26*d* (see FIG. 4A and FIG. 4B). When the outside switch 13 is operated, a signal of the outside switch 13 may be inputted to the controller 30, and the controller 30 may apply an operational signal to the drive motor 22 (see ① in FIG. 9). When the operational signal is applied from the controller 30, the drive motor 22 may begin to rotate. During a process of popping up the door 12, the drive motor 22 may rotate in a direction in which the nut rod 24 is extended to the outside of the housing 21. When the drive motor 22 rotates, the worm gear 22*a* and the worm wheel 22*b* may rotate, so that the lead screw 23 may rotate. Because the lead screw 23 and the nut rod 24 are thread-coupled to each other and the rotation of the nut rod 24 is restricted, the nut rod 24 and the lead nut 25 may linearly move when the lead screw 23 rotates. In the instant case, the nut rod 24 and the operating rod 26 may not be extended outward, and the elastic member 26*d* may be compressed as the nut rod 24 moves. In the instant case, the contactor 25*a* may be separated from the first terminal 28*a* as the nut rod 24 moves forward thereof.

Figure 5A:
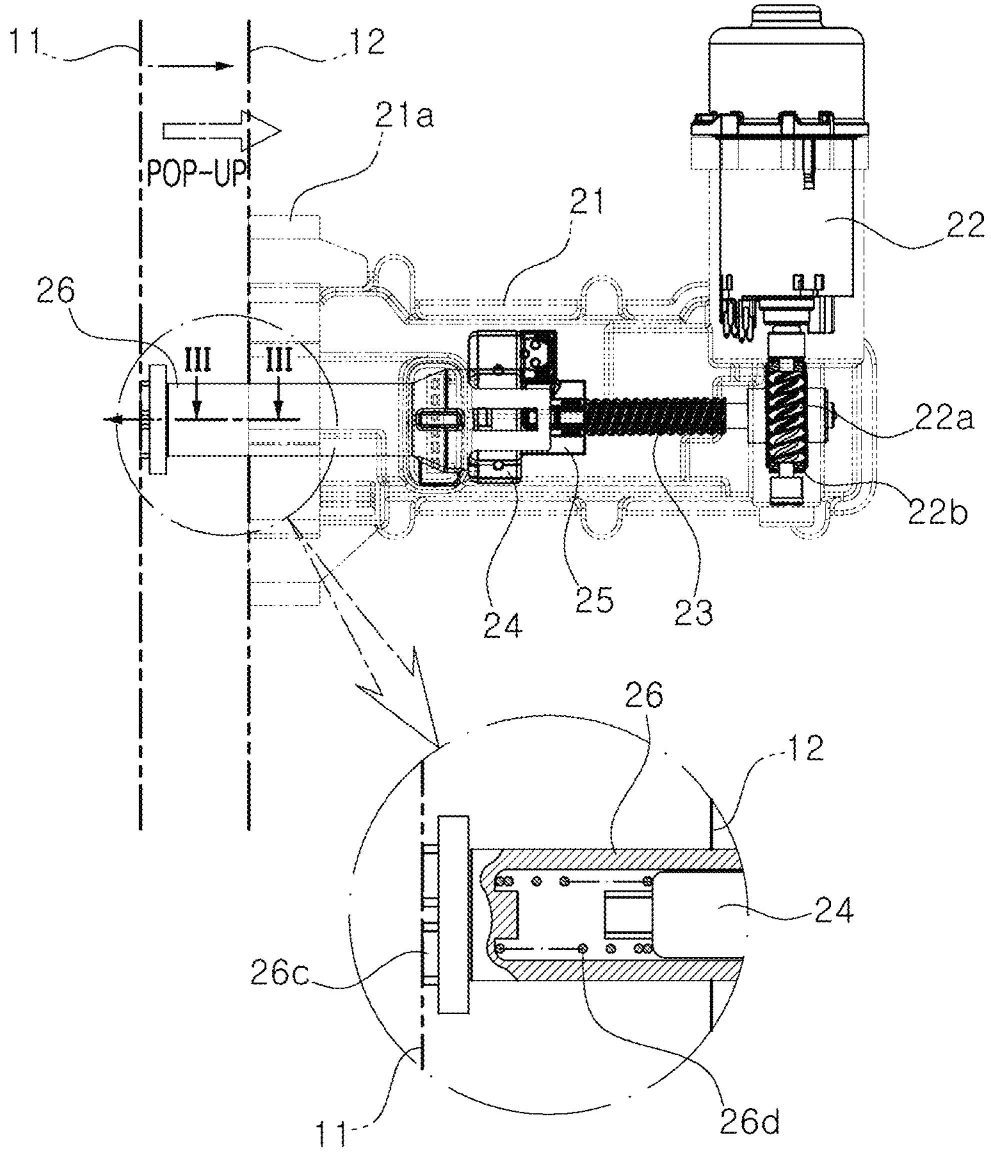
FIG. 5A is a perspective view including an enlarged and encircled view indicated by a dotted arrow in a cross-sectional view according to line III-III and shown in the lower part.
Figure 5B:
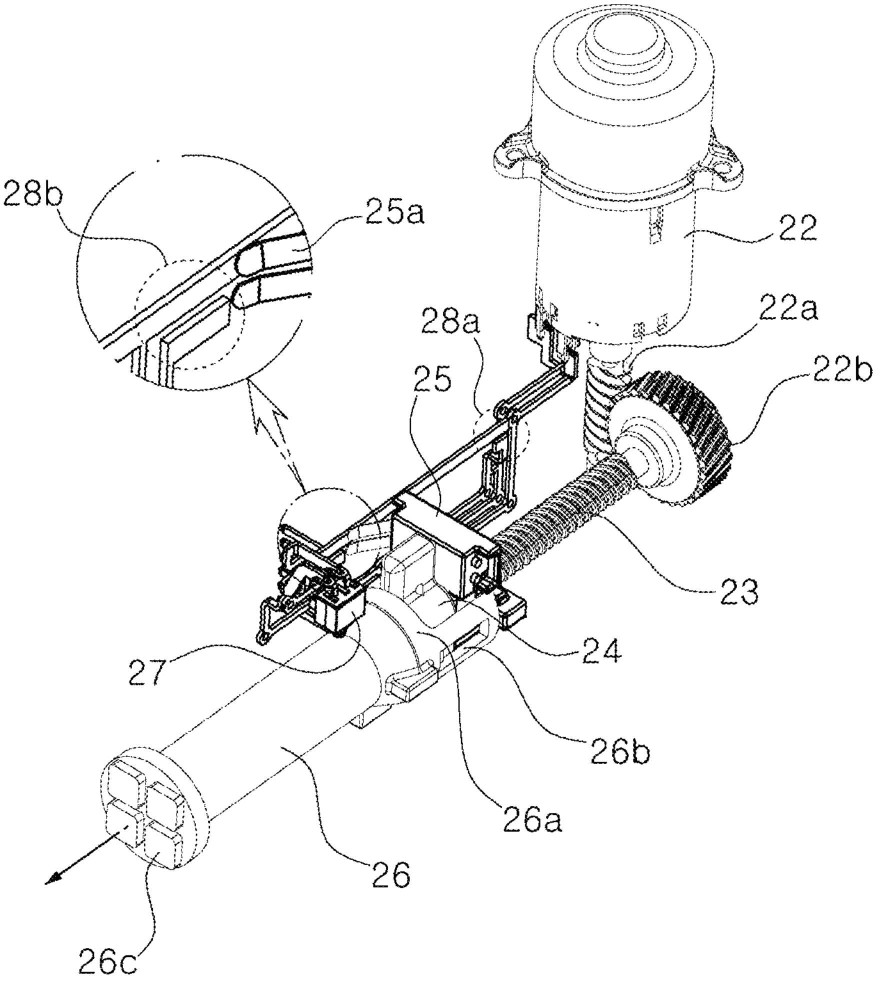
FIG. 5B is an isometric view in the upper part of FIG. 5A, illustrating a state in which an operating rod of the pop-up actuator for a vehicle door according to an exemplary embodiment of the present disclosure protrudes from a door and the door begins to pop upwards.

Thereafter, as illustrated in FIG. 5A and FIG. 5B, the door 12 may be popped up. When the drive motor 22 continuously rotates, the nut rod 24 and the lead nut 25 may continuously move linearly forward thereof. When the elastic member 26*d* is maximally compressed by the forward movement of the nut rod 24, the nut rod 24 and the operating rod 26 may be extended to the outside thereof. When the elastic member 26*d* is maximally compressed by the forward movement of the nut rod 24, the elastic member 26*d* may push the operating rod 26 without being compressed any further. When the operating rod 26 is pushed and extended from the housing 21, the door 12 may pop up from the vehicle body 11. When the operating rod 26 is extended between the vehicle body 11 and the door 12, the door 12 may be popped up by the extended operating rod 26, and a gap may be formed between the door 12 and the vehicle body 11. Furthermore, as the nut rod 24 moves forward, the contactor 25*a* may be connected to the second terminal 28*b*. When the nut rod 24 moves forward with a predetermined distance and the contactor 25*a* is connected to the second terminal 28*b*, the controller 30 may be configured to stop the drive motor 22 (see ② in FIG. 9).

Figure 6A:
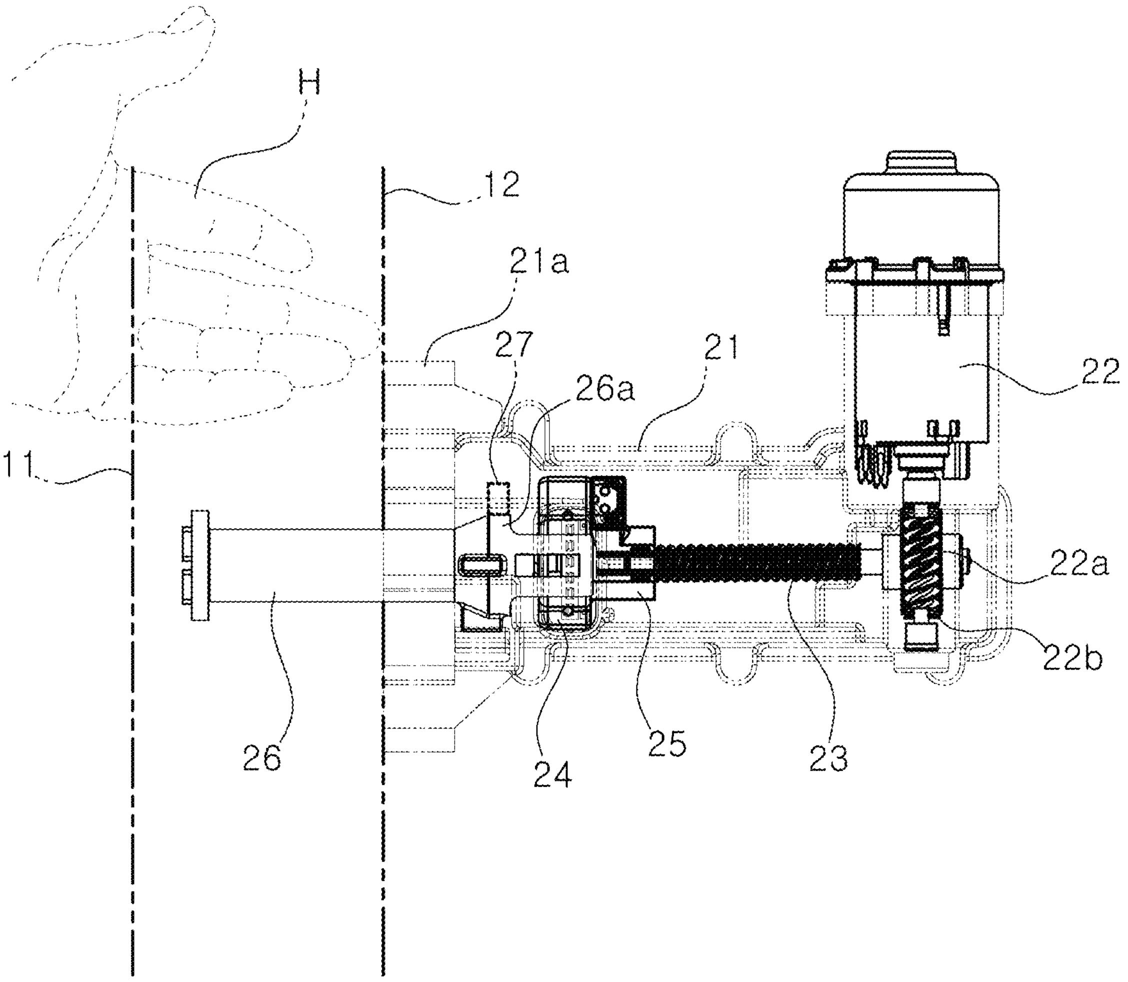
FIG. 6A and FIG. 6B are a cross-sectional view and a perspective view, respectively illustrating a state in which the door is completely popped up by the pop-up actuator for a vehicle door according to an exemplary embodiment of the present disclosure.
Figure 6B:
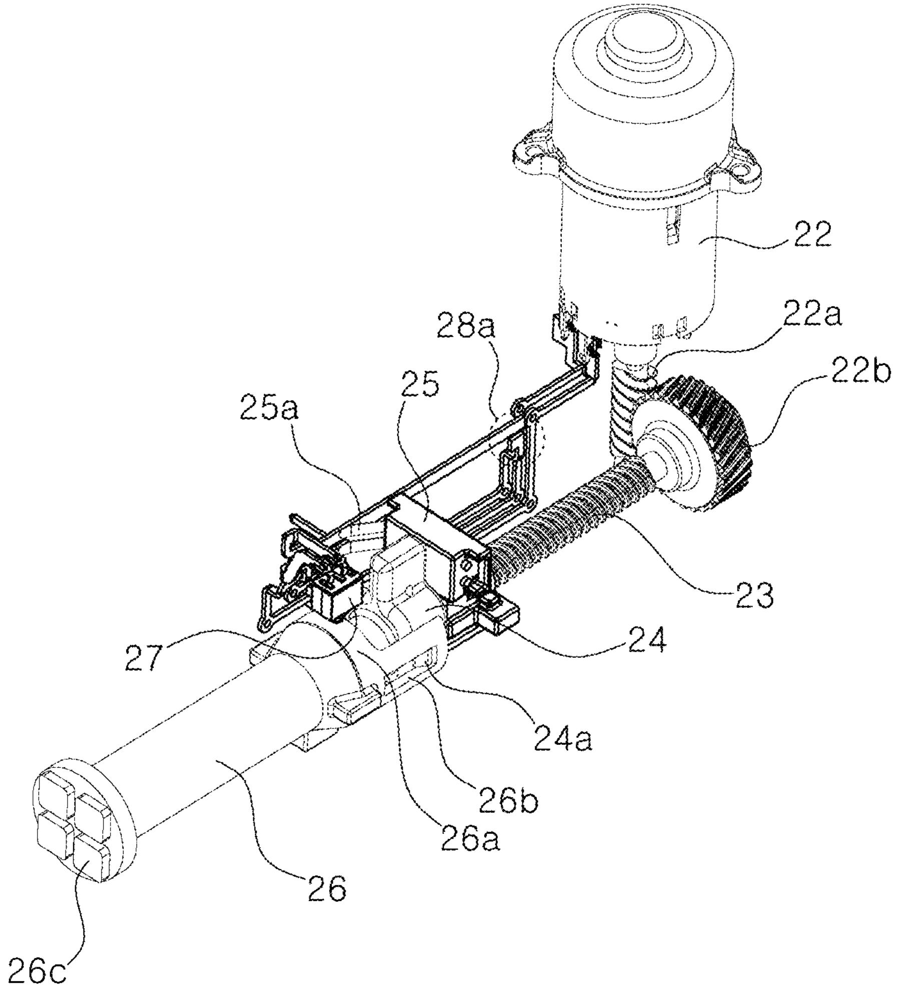

When the door 12 completely pops up, the occupant may put his or her hand H into the gap between the door 12 and the vehicle body 11 and open the door 12 (see FIG. 6A and FIG. 6B). Even though the nut rod 24 does not move forward as the drive motor 22 is stopped, the compressed elastic member 26*d* additionally may push the operating rod 26 while being retracted so that a clearance between the door 12 and the vehicle body may increase to the extent that the occupant may put his or her hand H into the clearance between the door 12 and the vehicle body. Therefore, the occupant may open the door 12. In the instant case, when the operating rod 26 is maximally extended, the protruding portion 26*a* may operate the operation switch 27 (see ③ in FIG. 9). When the pop-up actuator 20 is fully deployed, the operation switch 27 may be operated after the contactor 25*a* is connected to the second terminal 28*b*.

Figure 7:
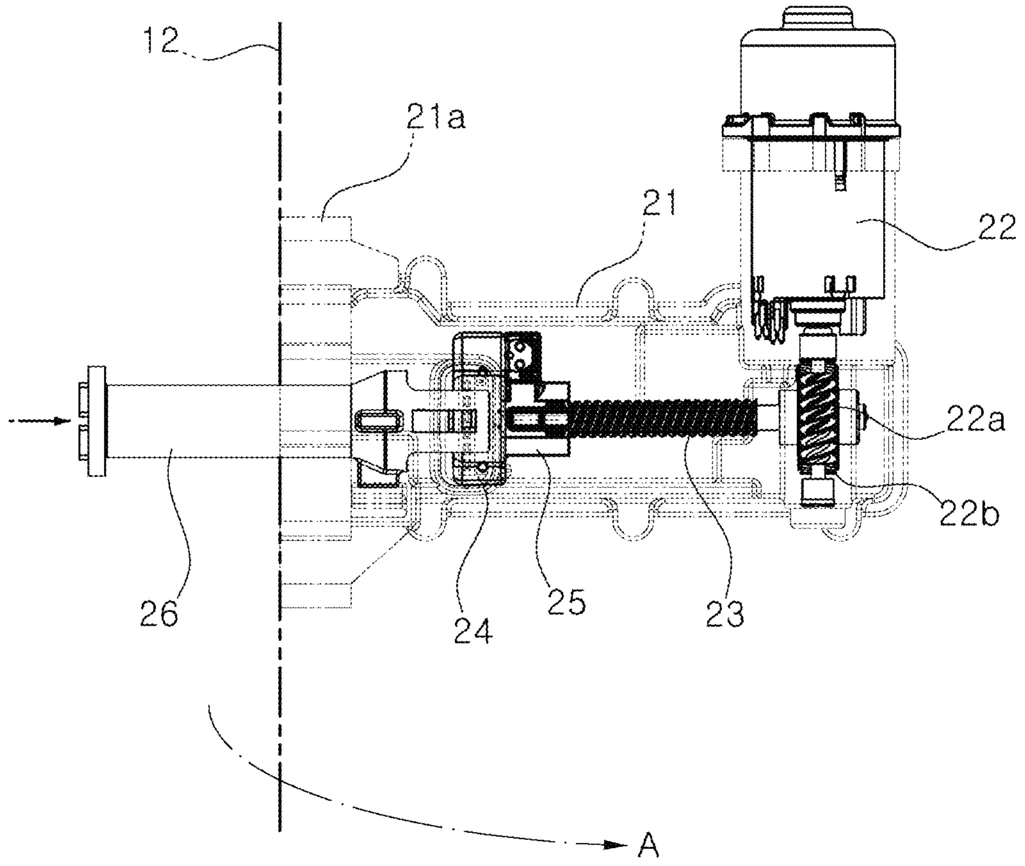
FIG. 7 is a cross-sectional view exemplarily illustrating a state in which the door is opened in a state in which the pop-up actuator for a vehicle door according to an exemplary embodiment of the present disclosure is deployed.

FIG. 7 illustrates a state in which the door 12 is being opened in a direction of arrow A by the occupant. The occupant may continuously open the door 12 so that the door 12 is sufficiently opened to enable the occupant to get in or out. Meanwhile, because the operation switch 27 has already operated, the controller 30 may be configured to rotate the drive motor 22 in a reverse direction opposite to the direction in which the drive motor 22 rotates to pop up the door 12. When the drive motor 22 rotates reversely, the operating rod 26, the nut rod 24, and the lead nut 25 may move rearward and begin to be encased in the housing 21.

Figure 8:
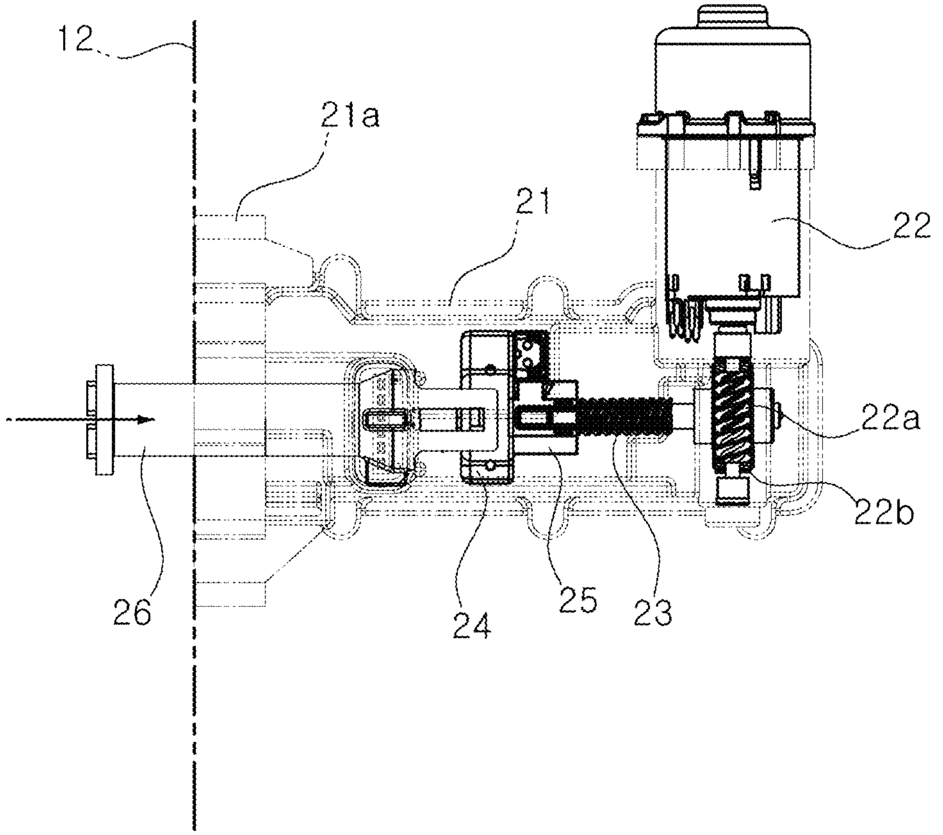
FIG. 8 is a cross-sectional view exemplarily illustrating a state in which the pop-up actuator for a vehicle door according to an exemplary embodiment of the present disclosure is initiated to be accommodated.

Thereafter, when the drive motor 22 continuously rotates reversely, the operating rod 26, the nut rod 24, and the lead nut 25 may be accommodated in the housing 21, as illustrated in FIG. 8.

Figure 9:
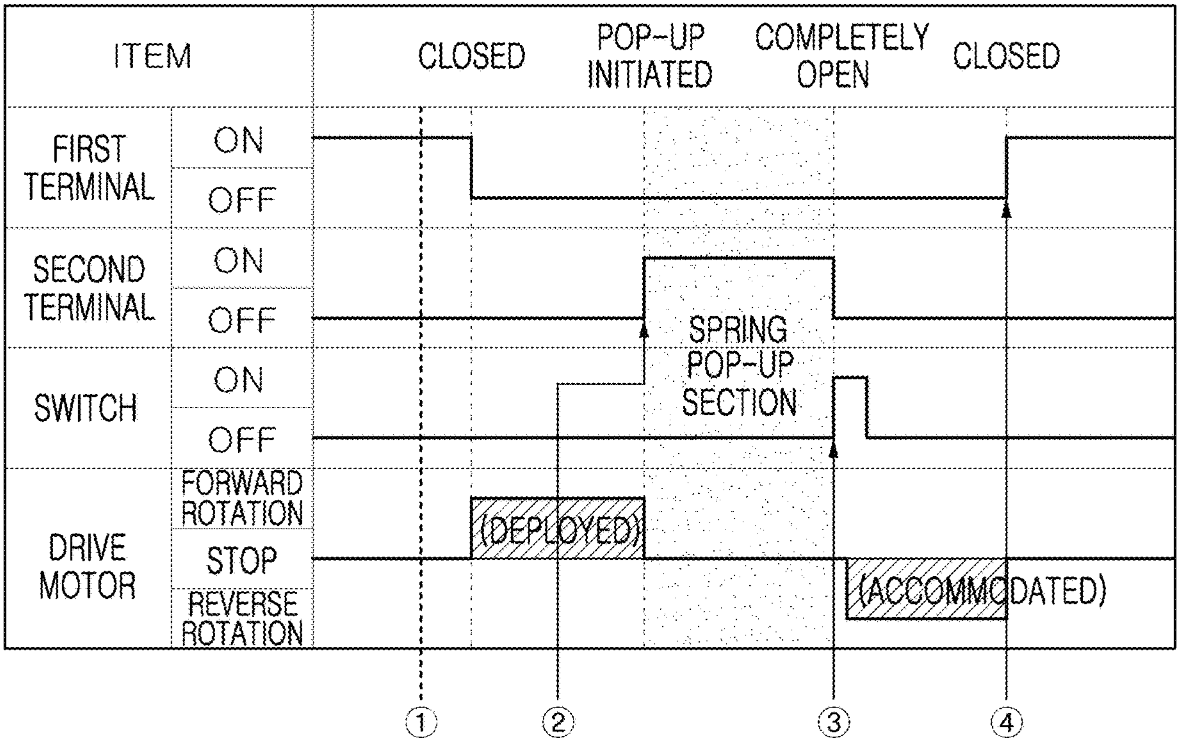
FIG. 9 is a chart illustrating control signals for the pop-up actuator for respective operations of the door to which the pop-up actuator for a vehicle door according to an exemplary embodiment of the present disclosure is applied.

When the operating rod 26, the nut rod 24, and the lead nut 25 are completely accommodated, the operating rod 26, the nut rod 24, and the lead nut 25 may be restored to the initial positions, the contactor 25*a* may be connected to the first terminal 28*a*, and the controller 30 may stop the drive motor 22 (see ④ in FIG. 9).

The pop-up actuator 20 according to an exemplary embodiment of the present disclosure has been referred to as being provided on the door 12. However, as a modification, the pop-up actuator 20 may be provided on the vehicle body 11 and pop up the door 12 while being extended from the vehicle body 11.

Furthermore, the pop-up actuator 20 may be applied to not only the door 12 of the vehicle but also an opening/closing portion provided in the vehicle and configured to be opened or closed. For example, the pop-up actuator may be applied to pop up a hood configured to cover an engine compartment, a fuel door configured to open or close a refueling port, or a charge port door configured to open or close a charge port for a battery.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pop-up actuator apparatus for a door, the pop-up actuator apparatus comprising:
- a housing provided in a vehicle;
- a drive motor mounted in the housing;
- a nut rod coupled to the drive motor and configured to be linearly moved by operation of the drive motor;
- a lead nut coupled to the nut rod and provided with a contactor;
- a pattern unit inserted in the housing and configured to apply power to the drive motor and detect a position of the nut rod;
- an operating rod coupled to an external portion of the nut rod and configured to extend from the housing by a forward movement of the nut rod to move the door away from a body of the vehicle; and
- an elastic member inserted in the operating rod and configured to be compressed by the nut rod being moved by the drive motor to pop up the operating rod by an elastic force of the elastic member,
- wherein the pattern unit includes:
  - a first terminal configured to detect an initial position of the nut rod; and
  - a second terminal configured to detect the forward movement of the nut rod in response that the nut rod moves forward a predetermined distance, and
- wherein when the lead nut moves forward or rearward together with the nut rod, the contactor is configured to be electrically connected to the first terminal to detect the initial position of the nut rod and to the second terminal to detect the forward movement of the nut rod, wherein a coupling hole is provided in an external portion of the operating rod, and a coupling protrusion is formed on an external portion of the nut rod and engaged with the coupling hole, so that the nut rod slides by the predetermined distance in the operating rod, and wherein when the elastic member is maximally compressed by the forward movement of the nut rod, the elastic member is configured to push the operating rod outside of the housing without being compressed any further to pop up the door from the body of the vehicle.

2. The pop-up actuator apparatus of claim 1, wherein the elastic member is provided at a front end portion of the nut rod and compressed by the nut rod in response to the nut rod being moved forward by a forward rotation of the drive motor, and the operating rod is extended from the housing as the operating rod moves forward relative to the nut rod in response that the nut rod is moving forward the predetermined distance or more than the predetermined distance so that the operating rod pops up the door.

3. The pop-up actuator apparatus of claim 1, further including:

a controller electrically connected to the drive motor and mounted on the door, wherein the controller is configured to rotate the drive motor in a forward direction so that the operating rod is extended from the housing in response that an outside switch is operated by an occupant.

4. The pop-up actuator apparatus of claim 3, wherein an operation switch electrically connected to the controller is provided to output a signal to the controller so that the operating rod returns to an initial position of the operating rod and the nut rod returns to the initial position of the nut rod in response that the operating rod is completely extended.

5. The pop-up actuator apparatus of claim 4, wherein the operation switch is provided to operate after the contactor is connected to the second terminal.

6. The pop-up actuator apparatus of claim 4, wherein a protruding portion is formed to protrude from the operating rod in a radial direction of the operating rod, and the protruding portion comes into contact with the operation switch in response that the operating rod is completely extended.

7. The pop-up actuator apparatus of claim 4, wherein in response that an outside switch is operated by the occupant, the nut rod is moved forward by a forward rotation of the drive motor, and the contactor is separated from the first terminal.

8. The pop-up actuator apparatus of claim 7, wherein a controller is configured to stop the forward rotation of the drive motor in response that the nut rod moves forward the predetermined distance and the contactor is connected to the second terminal.

9. The pop-up actuator apparatus of claim 8, wherein in response that the operating rod is completely extended and the operation switch operates, the nut rod moves rearward thereof, and the drive motor rotates in a reverse direction so that the operating rod and the nut rod return to the initial positions thereof.

10. The pop-up actuator apparatus of claim 9, wherein the controller is configured to stop a reverse rotation of the drive motor in response that the nut rod moves rearward and the contactor is connected to the first terminal.

11. The pop-up actuator apparatus of claim 1, wherein the lead nut is fastened to a rear end portion of the nut rod.

12. The pop-up actuator apparatus of claim 1, wherein a damper is provided at a front end portion of the operating rod.

13. The pop-up actuator apparatus of claim 1, wherein the coupling hole is provided in a form of an elongated hole in the external portion of the operating rod.

14. The pop-up actuator apparatus of claim 1, further including:

a lead screw thready-coupled to the nut rod and configured to be rotated by the drive motor and linearly move the nut rod.

15. The pop-up actuator apparatus of claim 14, wherein a worm gear is mounted on an output shaft of the drive motor, and wherein a worm wheel is fixed on the lead screw and in mesh with the worm gear.

16. The pop-up actuator apparatus of claim 1, wherein the housing is provided on the door, and wherein the operating rod pops up the door while being extended from the door toward the body of the vehicle.

* * * * *